United States Patent
Goode et al.

(10) Patent No.: US 11,295,764 B1
(45) Date of Patent: Apr. 5, 2022

(54) DATA STORAGE DEVICE TRANSMITTING CONFIGURATION DATA TO A PREAMP CIRCUIT OVER A READ LINE

(71) Applicant: Western Digital Technologies, Inc., San Jose, CA (US)

(72) Inventors: Jonas A. Goode, Lake Forest, CA (US); Richard L. Galbraith, Rochester, MN (US); Joey M. Poss, Rochester, MN (US); John T. Contreras, Palo Alto, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/214,870

(22) Filed: Mar. 28, 2021

(51) Int. Cl.
   *G11B 5/00* (2006.01)
   *G11B 20/10* (2006.01)
   *G11B 5/012* (2006.01)

(52) U.S. Cl.
   CPC ........ *G11B 5/012* (2013.01); *G11B 20/10314* (2013.01)

(58) Field of Classification Search
   CPC ........ G11B 20/10194; G11B 20/10027; G11B 20/1022; G11B 20/10481; G11B 20/1403; G11B 2020/251; G11B 5/00; G11B 20/10; G11B 20/0013

USPC .................................. 360/39, 51, 61, 67, 46
See application file for complete search history.

(56) References Cited

U.S. PATENT DOCUMENTS

| | | | |
|---|---|---|---|
| 6,111,717 A | 8/2000 | Cloke et al. | |
| 7,787,206 B2 | 8/2010 | Yen | |
| 8,107,182 B2 | 1/2012 | Yen | |
| 8,665,547 B1 | 3/2014 | Yeo et al. | |
| 8,724,249 B2 | 5/2014 | Contreras | |
| 8,929,013 B1 | 1/2015 | Mastrocola et al. | |
| 9,111,561 B1 | 8/2015 | Contreras et al. | |
| 9,343,103 B2* | 5/2016 | Wilson | G11B 20/10027 |
| 10,991,391 B1* | 4/2021 | Tang | G11B 20/10481 |
| 2016/0260446 A1* | 9/2016 | Buch | G11B 5/09 |

* cited by examiner

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a head actuated over a magnetic media, wherein the head comprises a write element and a first read element. A preamp circuit comprising an interface includes at least a write line associated with the write element of the head and a first read line associated with the first read element of the head. A first read signal is received from the preamp circuit over the first read line during a read operation, and configuration data is transmitted to the preamp circuit over the first read line during a write operation.

20 Claims, 7 Drawing Sheets

5-bit Pattern Context

| Decimal | Binary | Center bit description | DWS Action |
|---|---|---|---|
| 0 | 00000 | Middle of 5T | Lower IW & OSA |
| 1 | 00001 | Middle of 4T | Lower IW & OSA |
| 2 | 00010 | Leading Edge of 3T | |
| 3 | 00011 | Leading Edge of 3T | |
| 4 | 00100 | 1T after 2T | Increase OSA |
| 5 | 00101 | 1T after 1T | Increase OSA |
| 6 | 00110 | Trailing Edge of 2T | |
| 7 | 00111 | Trailing Edge of 3T | |
| 8 | 01000 | Trailing Edge of 3T | |
| 9 | 01001 | Trailing Edge of 2T | |
| 10 | 01010 | 1T after 1T | Increase OSA |
| 11 | 01011 | 1T after 2T | Increase OSA |
| 12 | 01100 | Leading Edge of 2T | |
| 13 | 01101 | Leading Edge of 2T | |
| 14 | 01110 | Middle of 3T | Lower IW & OSA |
| 15 | 01111 | Middle of 4T | Lower IW & OSA |
| 16 | 10000 | Middle of 4T | Lower IW & OSA |
| 17 | 10001 | Middle of 3T | Lower IW & OSA |
| 18 | 10010 | Leading Edge of 2T | |
| 19 | 10011 | Leading Edge of 2T | |
| 20 | 10100 | 1T after 2T | Increase OSA |
| 21 | 10101 | 1T after 1T | Increase OSA |
| 22 | 10110 | Trailing Edge of 2T | |
| 23 | 10111 | Trailing Edge of 3T | |
| 24 | 11000 | Trailing Edge of 3T | |
| 25 | 11001 | Trailing Edge of 2T | |
| 26 | 11010 | 1T after 1T | Increase OSA |
| 27 | 11011 | 1T after 2T | Increase OSA |
| 28 | 11100 | Leading Edge of 3T | |
| 29 | 11101 | Leading Edge of 3T | |
| 30 | 11110 | Middle of 4T | Lower IW & OSA |
| 31 | 11111 | Middle of 5T | Lower IW & OSA |

FIG. 5B

DATA STORAGE DEVICE TRANSMITTING CONFIGURATION DATA TO A PREAMP CIRCUIT OVER A READ LINE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

BRIEF DESCRIPTION OF THE DRAWINGS

FIGS. 5A and 5B show an embodiment wherein the configuration data configures a write parameter during a write operation, such as a data dependent write current amplitude (Iw) and overshoot amplitude (OSA).

DETAILED DESCRIPTION

Figure 1:
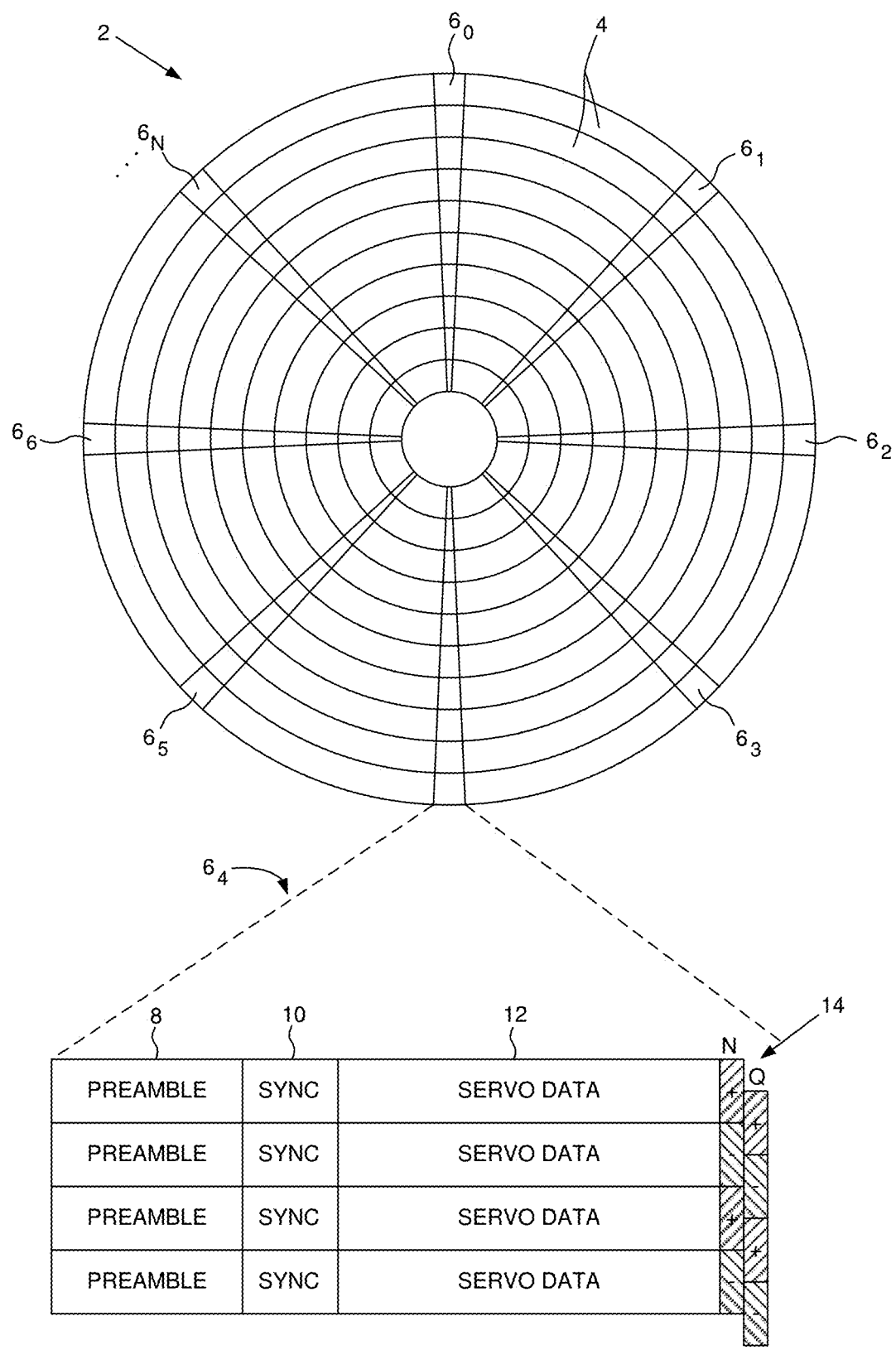
FIG. 1 shows a prior art disk format comprising a plurality of servo tracks defined by servo sectors.
Figure 2A:
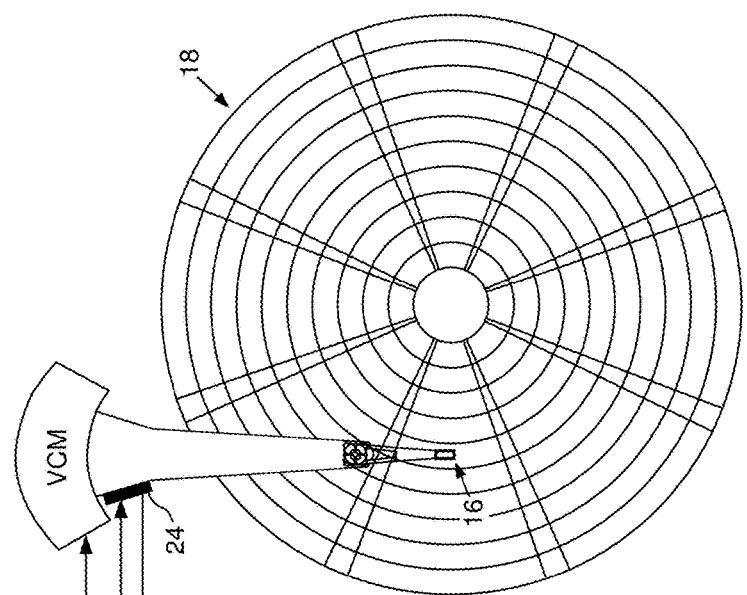
FIG. 2A shows a data storage device in the form of a disk drive according to an embodiment comprising a head actuated over a disk and a preamp circuit comprising an interface having at least a write line associated with a write element of the head and a first read line associated with a first read element of the head.
Figure 2B:
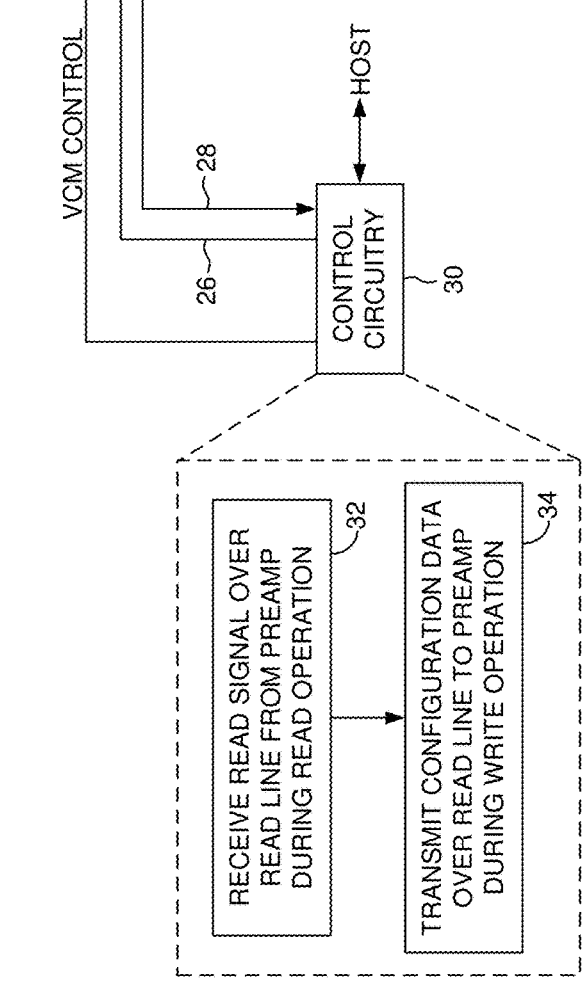
FIG. 2B is a flow diagram according to an embodiment wherein a first read signal is received from the preamp over the first read line during a read operation, and configuration data is transmitted to the preamp over the first read line during a write operation.
Figure 2C:
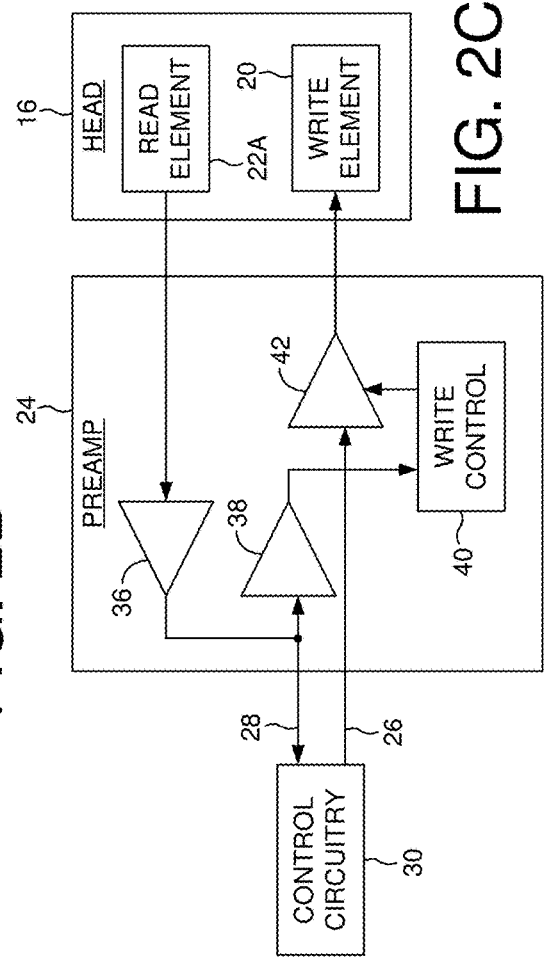
FIG. 2C shows a preamp circuit according to an embodiment comprising an output amplifier configured to transmit the first read signal to the control circuitry over the first read line, and an input amplifier configured to receive the configuration data from the control circuitry over the first read line.

FIG. 2A shows a data storage device in the form of a disk drive according to an embodiment comprising a head 16 actuated over a disk 18, wherein the head 16 comprises a write element 20 and a first read element 22A (FIG. 2C). While a disk drive is used as an illustrative example herein, various embodiments of the invention may be applied to, and/or include, other types of data storage device with magnetic media such as tape drives. The disk drive further comprises a preamp circuit 24 comprising an interface having at least a write line 26 associated with the write element 20 of the head 16 and a first read line 28 associated with the first read element 22A of the head 16. Control circuitry 30 is configured to execute the flow diagram of FIG. 2B, wherein a first read signal is received from the preamp over the first read line during a read operation (block 32), and configuration data is transmitted to the preamp over the first read line during a write operation (block 34).

The fidelity of the magnetic transitions written onto the magnetic media, including the degradation of adjacent data tracks due to adjacent track interference (ATI) when writing to a target data track, may depend on a number of write parameters configured for the head. For example, the write parameters may include parameters of a write current (Iw) applied to a write coil of the head, including an amplitude of the write current, an overshoot amplitude (OSA) of the write current, and an overshoot duration (OSD) of the write current. In one embodiment, a write parameter may be boosted (i.e., write boost) depending on the pattern of magnetic transitions being written to the magnetic media. For example when writing a high frequency pattern of magnetic transitions, the write current OSA may be boosted in order to fully saturate the magnetic media, whereas when writing a lower frequency pattern of magnetic transitions, the write current OSA may be un-boosted while boosting the write current amplitude and/or OSD in order to reduce ATI.

Conventionally one or more write parameters have been dynamically adjusted within the preamp circuit during a write operation by including circuitry within the preamp that detects specific data patterns being written and then adjusts the write parameter(s) accordingly. However the complexity of the data dependent detection circuitry within the preamp circuit is typically limited due to the fabrication process employed when implementing the signal processing circuits required for the write/read operations. Accordingly in one embodiment, the data dependent detection circuitry is implemented within the control circuitry 30 of FIG. 2A which is typically fabricated with a much higher transistor density to facilitate buffering of the write data as well as more sophisticated data pattern detection algorithms. The control circuitry 30 then transmits configuration data to the preamp circuit 24 during a write operation in order to configure one or more write parameters into an optimal setting that corresponds to the different data patterns being written to the magnetic media. In one embodiment in order to reduce the number of transmission lines connecting the preamp circuit 24 to the control circuitry 30, the configuration data for configuring one or more write parameters during a write operation are transmitted from the control circuitry 30 to the preamp circuit 24 over one or more read lines. That is since the read line(s) are conventionally unused during a write operation, in one embodiment the read line(s) are used to transmit the data dependent configuration data from the control circuitry 30 to the preamp circuit 24, thereby obviating the need for additional transmission lines that would otherwise be needed to transmit the configuration data.

Any suitable interface circuitry may be employed to transmit a read signal from the preamp circuit 24 to the control circuitry 30 during a read operation, and to receive configuration data from the control circuitry 30 during a write operation. In the embodiment of FIG. 2C, the preamp circuit 24 comprises an output amplifier 36 coupled to a suitable read element 22A and configured to transmit a read signal over the read line 28 during a read operation. The preamp circuit 24 further comprises an input amplifier 38 configured to receive configuration data over the read line 28 during a write operation, wherein the configuration data is processed by a write control circuit 40 in order to configure one or more data dependent write parameters during the write operation. That is as the write data is transmitted over the write line 26, corresponding configuration data is concurrently transmitted over the read line 28 and processed by the write control circuit 40 which makes corresponding adjustments to the write parameters (e.g., by adjusting operation of a write amplifier 42). In one embodiment, the preamp circuit 24 comprises suitable circuitry for enabling/ disabling the input amplifier 38 or the output amplifier 36 depending on the operating mode (i.e., write or read operation). For example, the preamp circuit 24 may comprise suitable switches (not shown) for connecting/disconnecting the input amplifier 38 or the output amplifier 36 to the read line 28. In another embodiment, the input amplifier 38 and the output amplifier 36 may be implemented with suitable tristate circuitry in order to enable/disable the amplifiers depending on the operating mode. The interface of the preamp circuit 24 may comprise additional transmission lines (not shown in FIG. 2C), such as a read/write enable line, a mode line, or a serial input/output (SIO) used to transmit other configuration data, such as a head selection circuitry in a multiple head disk drive.

Figure 3:
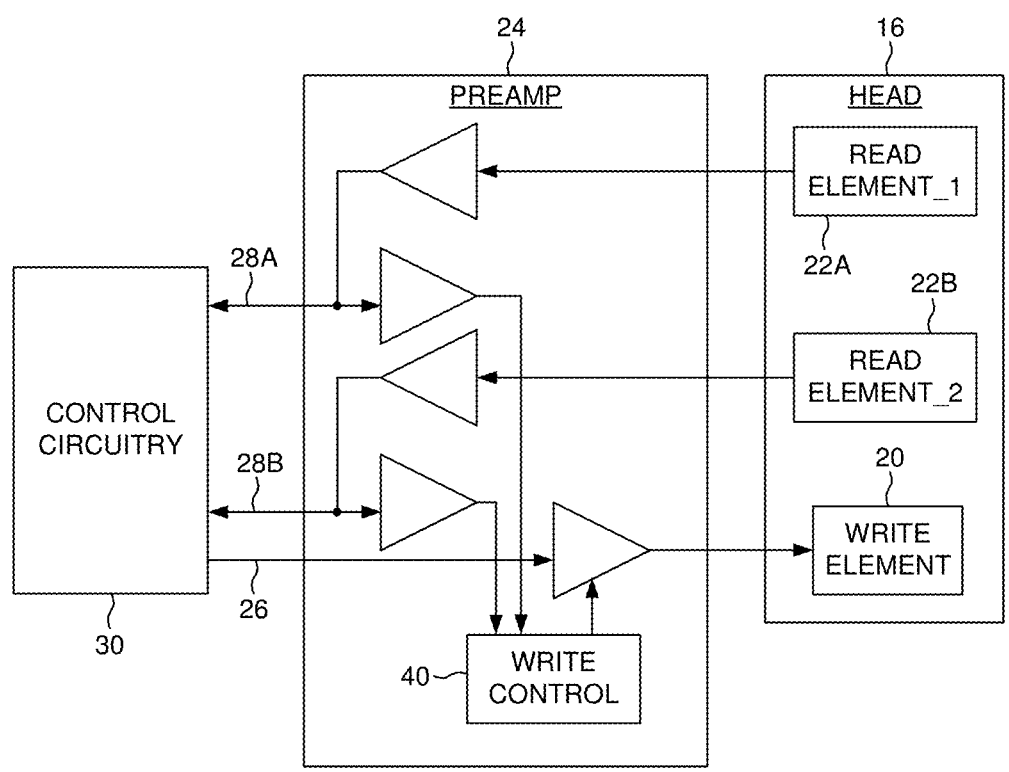
FIG. 3 shows an embodiment wherein the head comprises first and second read elements configured for two-dimensional magnetic recording (TDMR), and configuration data is transmitted over the corresponding first and second read lines during a write operation.
Figure 4:
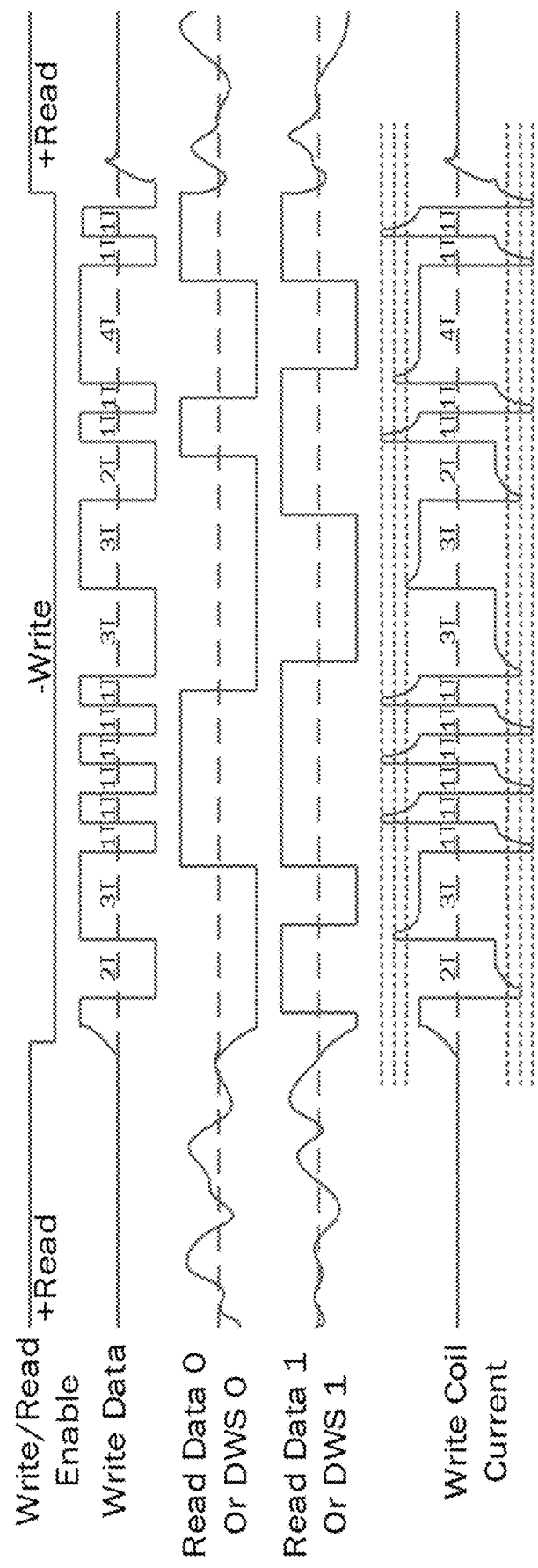
FIG. 4 shows an embodiment wherein the configuration data configures a write parameter during a write operation, such as a data dependent overshoot amplitude (OSA) of a write current applied to a write coil.

FIG. 3 shows an embodiment wherein the head 16 may comprise a first read element 22A and a second read element 22B configured to implement two-dimensional magnetic recording (TDMR) read operations. For example, in one embodiment the read elements 22A and 22B may be radially offset while the head is reading a target data track, wherein the resulting read signals (transmitted over read lines 28A and 28B) may be processed by the control circuitry 30 using any suitable TDMR signal processing in order to increase the accuracy of the read operation. During a write operation, configuration data (e.g., data dependent write parameter settings) may be transmitted to the preamp circuit 24 over both the first and second read lines 28A and 28B, thereby increasing the resolution of the configuration data. For example, in one embodiment the configuration data may be transmitted using 2-bit binary signaling such that the configuration data may take on one of four values during a bit cell of the write operation. FIG. 4 shows an example embodiment wherein an overshoot amplitude (OSA) of the write current is configured using a 2-bit binary signaling received over the first and second read lines 28A and 28B. In this embodiment, the write/read enable signal is high during a read operation at which time the read signals from the read elements may be transmitted over the first and second read lines 28A and 28B to the control circuitry 30. During a write operation, the 2-bit configuration data is represented by a first dynamic waveform shaping signal (DWS 0) and a second dynamic waveform shaping signal (DWS 1) which are configured based on the data patterns being written. In this example, the 2-bit DWS lines configure the OSA write parameter into one of three different levels depending on the data pattern being written (e.g., 1T, 2T, 3T or 4T data pattern) as illustrated by the write current signal of FIG. 4. That is in this embodiment, the control circuitry 30 detects the data pattern being written and then configures the 2-bit DWS signals over the first and second read lines 22A and 22B in order to optimize the OSA write parameter depending on the data pattern being written.

Figure 5A:
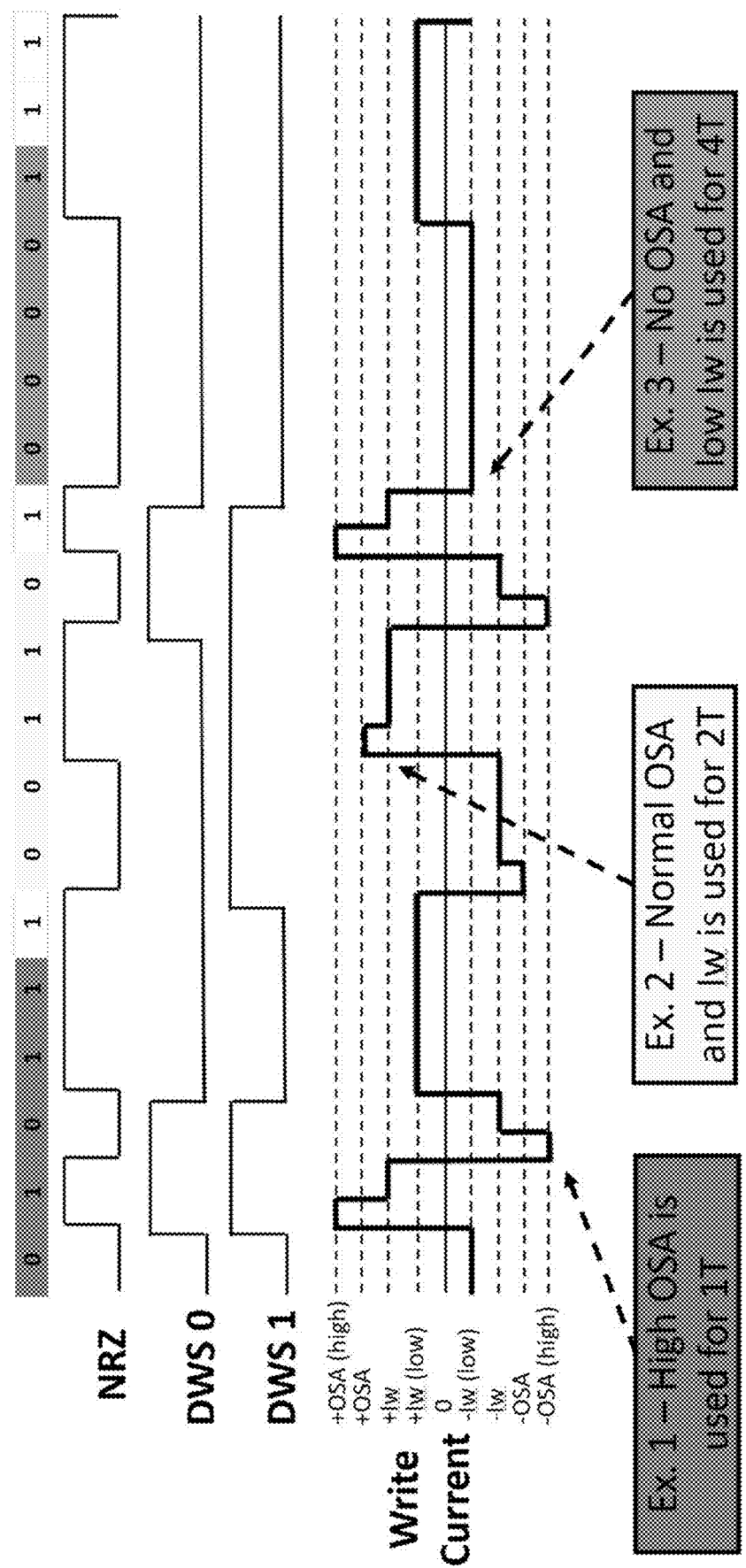

FIG. 5A shows an example embodiment wherein the write current amplitude (Iw) and an overshoot amplitude (OSA) may be configured using a 2-bit binary signaling received over the first and second read lines 28A and 28B. The top line of FIG. 5A represents the digital data being written to the magnetic media which is encoded into a corresponding non-return to zero (NRZ) signal. In the example of FIG. 5A, the 2-bit DWS signals configure a high OSA for a 1T data pattern, a normal OSA and Iw for a 2T data pattern, and no OSA and low Iw for a 4T data pattern. FIG. 5B shows a table of all possible 5-bit data patterns that may be written and the corresponding write parameter settings for Iw and OSA according to an embodiment where the configuration data is transmitted using 2-bit binary signaling.

Figure 6:
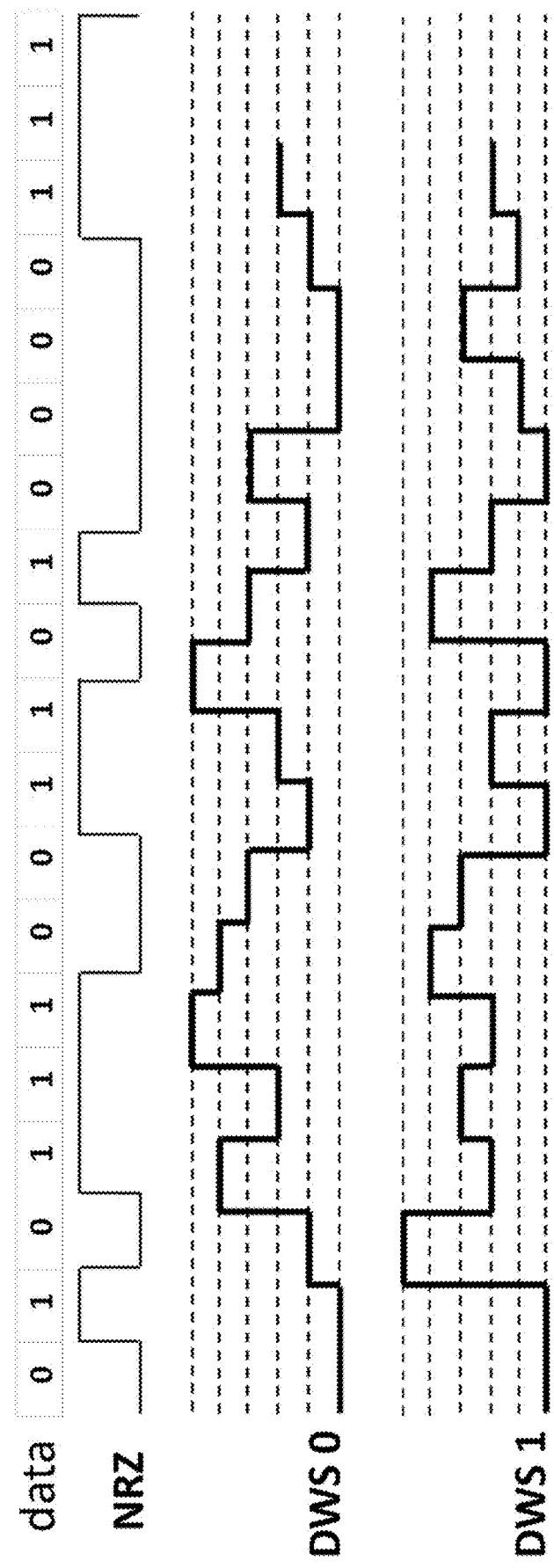
FIG. 6 shows an embodiment wherein the configuration data may be transmitted over two read lines using a suitable M-ary signaling (e.g., M-ary Pulse-Amplitude Modulation) that increases the resolution of the configuration data to five bits.

In another embodiment, the DWS signals may be modulated using any suitable M-ary signaling technique (e.g., M-ary Pulse-Amplitude Modulation (PAM)) in order to increase the resolution of the configuration data. For example, in one embodiment the resolution of the configuration data may be increased from 2 bits to 5 bits using PAM signaling such that each five bit pattern shown in the table of FIG. 5B may be written with a corresponding custom write parameter setting(s). FIG. 6 shows an example of this embodiment wherein the write current amplitude (Iw) and overshoot amplitude (OSA) may be adjusted to a custom amplitude at each bit cell of the data sequence by transmitting the DWS signals with one of six unique levels, thereby implementing a 5-bit signaling for the configuration data.

In one embodiment, the write parameter(s) configured during a write operation may comprise a parameter of a write assist bias applied to a suitable write assist element, such as any suitable parameter(s) of a bias applied to a laser in heat assisted magnetic recording (HAMR), a bias applied to a spin torque oscillator (STO) in microwave assisted magnetic recording (MAMR), or a bias applied to any other suitable material stack for energy assisted recording. In one embodiment, the parameters configured for the write assist element may be similar to the parameters configured to the write current (e.g., bias amplitude, OSA, OSD, etc.). In one embodiment, data dependent write parameters may be configured for both a write current and a write assist element in order to optimize the fidelity of the recorded magnetic transitions as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC).

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a magnetic media;
   a head actuated over the magnetic media, wherein the head comprises a write element and a first read element;
   a preamp circuit comprising an interface comprising at least a write line associated with the write element of the head and a first read line associated with the first read element of the head; and
   control circuitry configured to:
      receive a first read signal from the preamp circuit over the first read line during a read operation;
      transmit write data to the preamp circuit over the write line during a write operation; and
      concurrently transmit configuration data to the preamp circuit over the first read line during the write operation.

2. The data storage device as recited in claim 1, wherein the configuration data configures at least one write parameter of the write operation.

3. The data storage device as recited in claim 2, wherein the write parameter comprises at least one of an amplitude of a write current, an overshoot amplitude of the write current, or an overshoot duration of the write current.

4. A data storage device comprising:
   a magnetic media;
   a head actuated over the magnetic media, wherein the head comprises a write element and a first read element;
   a preamp circuit comprising an interface comprising at least a write line associated with the write element of the head and a first read line associated with the first read element of the head; and
   control circuitry configured to:
      receive a first read signal from the preamp circuit over the first read line during a read operation; and
      transmit configuration data to the preamp circuit over the first read line during a write operation, wherein the configuration data configures at least one write parameter of the write operation, wherein the write parameter comprises at least one of an amplitude of a laser current, an overshoot amplitude of the laser current, or an overshoot duration of the laser current.

5. A data storage device comprising:
a magnetic media;
a head actuated over the magnetic media, wherein the head comprises a write element and a first read element;
a preamp circuit comprising an interface comprising at least a write line associated with the write element of the head and a first read line associated with the first read element of the head; and
control circuitry configured to:
receive a first read signal from the preamp circuit over the first read line during a read operation; and
transmit configuration data to the preamp circuit over the first read line during a write operation, wherein the configuration data configures at least one write parameter of the write operation, wherein the write parameter comprises at least one of an amplitude of a write assist bias, an overshoot amplitude of the write assist bias, or an overshoot duration of the write assist bias.

6. A data storage device comprising:
a magnetic media;
a head actuated over the magnetic media, wherein the head comprises:
a write element;
a first read element; and
a second read element; and
a preamp circuit comprising an interface comprising:
at least a write line associated with the write element of the head;
a first read line associated with the first read element of the head; and
a second read line associated with the second read element of the head; and
control circuitry configured to:
receive a first read signal from the preamp circuit over the first read line during a read operation;
transmit configuration data to the preamp circuit over the first read line during a write operation;
receive a second read signal from the preamp circuit over the second read line during the read operation; and
transmit configuration data to the preamp circuit over the first read line and the second read line during the write operation.

7. The data storage device as recited in claim 6, wherein the configuration data configures a write parameter of the write operation into one of at least five different modes.

8. The data storage device as recited in claim 7, wherein the write parameter comprises at least one of an amplitude of a write current, an overshoot amplitude of the write current, or an overshoot duration of the write current.

9. A data storage device comprising:
a magnetic media;
a head actuated over the magnetic media, wherein the head comprises a write element and a first read element;
a preamp circuit comprising an interface comprising at least a write line associated with the write element of the head and a first read line associated with the first read element of the head; and
control circuitry configured to:
receive a first read signal from the preamp circuit over the first read line during a read operation; and
transmit configuration data to the preamp circuit over the first read line, wherein the configuration data is for configuring at least one write parameter of a write operation, wherein the write parameter comprises at least one of an amplitude of a laser current, an overshoot amplitude of the laser current, or an overshoot duration of the laser current.

10. The data storage device as recited in claim 9, wherein the control circuitry is further configured to transmit the configuration data to the preamp circuit over the first read line during the write operation.

11. The data storage device as recited in claim 9, wherein the write parameter comprises at least one of an amplitude of a write current, an overshoot amplitude of the write current, or an overshoot duration of the write current.

12. The data storage device as recited in claim 9, wherein the write parameter comprises at least one of an amplitude of a write assist bias, an overshoot amplitude of the write assist bias, or an overshoot duration of the write assist bias.

13. The data storage device as recited in claim 9, wherein the head further comprises a second read element and the interface of the preamp circuit further comprises a second read line associated with the second read element of the head, and the control circuitry is further configured to:
receive a second read signal from the preamp circuit over the second read line during the read operation; and
transmit configuration data to the preamp circuit over the first read line and the second read line during the write operation.

14. The data storage device as recited in claim 13, wherein the configuration data configures a write parameter of the write operation into one of at least five different modes.

15. The data storage device as recited in claim 14, wherein the write parameter comprises at least one of an amplitude of a write current, an overshoot amplitude of the write current, or an overshoot duration of the write current.

16. A data storage device comprising:
a magnetic media;
a head actuated over the magnetic media, wherein the head comprises a write element and a first read element;
a preamp circuit comprising an interface comprising at least a write line associated with the write element of the head and a first read line associated with the first read element of the head; and
a means for receiving a first read signal from the preamp circuit over the first read line during a read operation;
a means for transmitting configuration data to the preamp circuit over the first read line a means for disabling and enabling the means for receiving a first read signal the preamp circuit over the first read line during a read operation; and
a means for disabling and enabling the means for transmitting configuration data to the preamp circuit over the first read line, wherein the configuration data configures at least one write parameter of a write operation.

17. A preamp circuit comprising:
an interface comprising:
at least a write line associated with a write element of a head;
a first read line associated with a first read element of the head; and
a second read line associated with a second read element of the head;
a first output amplifier configured to transmit a first read signal associated with the first read element over the first read line during a read operation;

a second output amplifier configured to transmit a second read signal associated with the second read element over the second read line during the read operation;

a first input amplifier configured to receive configuration data over the first read line, wherein the configuration data is for configuring at least one write parameter of a write operation; and a second input amplifier configured to receive configuration data over the second read line, wherein the configuration data is for configuring the at least one write parameter of the write operation.

18. The preamp circuit as recited in claim 17, wherein the input amplifier is configured to receive the configuration data over the first read line during the write operation.

19. The preamp circuit as recited in claim 17, wherein the configuration data comprises a write parameter comprising at least one of an amplitude of a write current, an overshoot amplitude of the write current, or an overshoot duration of the write current.

20. The preamp circuit as recited in claim 17, wherein the configuration data configures a write parameter of the write operation into one of at least five different modes.

* * * * *